(12) United States Patent
Baumann et al.

(10) Patent No.: US 10,305,150 B2
(45) Date of Patent: May 28, 2019

(54) TEMPERATURE CONTROL DEVICE FOR TEMPERING A BATTERY (71) Applicant: Mahle International GmbH, Stuttgart (DE)

(72) Inventors: Tobias Baumann, Bietigheim-Bissingen (DE); Thomas Kuznia, Esslingen (DE); Joachim Treier, Oppenau (DE); Bernd Schaefer, Stuttgart (DE); Stefan Hirsch, Stuttgart (DE); Timo Henke, Kernen/Rommelshausen (DE); Jerome Stoeckel, Bollwiller (FR)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/577,341

(22) PCT Filed: May 3, 2016

(86) PCT No.: PCT/EP2016/059891
§ 371 (c)(1),
(2) Date: Nov. 27, 2017

(87) PCT Pub. No.: WO2016/188714
PCT Pub. Date: Dec. 1, 2016

(65) Prior Publication Data
US 2018/0166755 A1    Jun. 14, 2018

(30) Foreign Application Priority Data
May 28, 2015   (EP) .................................. 15169653

(51) Int. Cl.
*H01M 2/00*    (2006.01)
*H01M 10/625*    (2014.01)
(Continued)

(52) U.S. Cl.
CPC ....... *H01M 10/625* (2015.04); *B60L 11/1874* (2013.01); *B60L 11/1879* (2013.01);
(Continued)

(58) Field of Classification Search
CPC ............ H01M 10/625; H01M 10/655; H01M 10/6556; H01M 10/6571; H01M 10/613;
(Continued)

(56) References Cited

U.S. PATENT DOCUMENTS 5,731,568 A    3/1998    Malecek
9,755,283 B2    9/2017    Hirsch et al.
(Continued)

FOREIGN PATENT DOCUMENTS

DE    102013210094 A1    10/2014
EP    2854211 A1    4/2015
EP    2854212 A1    4/2015

*Primary Examiner* — Jane J Rhee
(74) *Attorney, Agent, or Firm* — Fishman Stewart PLLC (57) ABSTRACT

A temperature control device for tempering of a battery may include a cooling device configured to be flowed through by a coolant for cooling the battery, an electric heating module configured to heat the battery and a heat transmission component configured to thermally couple the cooling device and the electric heating module to the battery. The battery may be temperature-controlled. The heat transmission component may have a recess. An electric heating module may be received in the recess and may be secured to the heat transmission component via an adhesive connection. The recess may be arranged on a first side comprising one of an upper side or underside of the heat transmission component. The electric heating module may be received in the recess and may terminate flush with the first side. The cooling device may lie in a planar manner against the first side of the heat transmission component.

19 Claims, 4 Drawing Sheets (51) Int. Cl.
    *H01M 10/6556*   (2014.01)
    *H01M 10/6571*   (2014.01)
    *H01M 10/655*   (2014.01)
    *B60L 11/18*   (2006.01)
    *F28F 3/10*   (2006.01)
    *H01M 10/0525*   (2010.01)
    *H01M 10/615*   (2014.01)
    *H01M 10/647*   (2014.01)
    *H01M 10/613*   (2014.01)
    *F28D 21/00*   (2006.01)
    *F28F 13/00*   (2006.01)

(52) U.S. Cl.
    CPC ............ *F28F 3/10* (2013.01); *H01M 10/655* (2015.04); *H01M 10/6556* (2015.04); *H01M 10/6571* (2015.04); *F28D 2021/0043* (2013.01); *F28F 2013/006* (2013.01); *H01M 10/0525* (2013.01); *H01M 10/613* (2015.04); *H01M 10/615* (2015.04); *H01M 10/647* (2015.04); *Y02E 60/122* (2013.01); *Y02T 10/705* (2013.01); *Y02T 10/7005* (2013.01)

(58) Field of Classification Search
    CPC ............. H01M 10/615; H01M 10/647; H01M 10/0525
    See application file for complete search history.

(56) References Cited

U.S. PATENT DOCUMENTS

| | | |
|---|---|---|
| 2006/0210868 A1 | 9/2006 | Kim et al. |
| 2015/0090427 A1* | 4/2015 | Brandauer .......... H01M 10/625 165/64 |
| 2016/0056511 A1 | 2/2016 | Schmid et al. |

\* cited by examiner

TEMPERATURE CONTROL DEVICE FOR TEMPERING A BATTERY

CROSS-REFERENCE TO RELATED APPLICATIONS

This application claims priority to PCT/EP2016/059891 filed on May 3, 2016, which also claims priority to EP 15169653.1 filed on May 28, 2015, the contents of which are hereby incorporated by reference in their entirety.

TECHNICAL FIELD

The present invention relates to a temperature control device for controlling tempering a battery, in particular of a motor vehicle, and a battery arrangement with such a temperature control device. The invention further relates to a motor vehicle with such a battery arrangement.

BACKGROUND

Rechargeable battery systems for electric vehicles with a purely electric drive and for hybrid vehicles and vehicles with fuel cell drive are the subject of current research. At present, in the said types of vehicle, lithium-ion batteries are preferably used, which are distinguished by a high energy density and an only slightly marked, undesired memory effect. The capability of a rechargeable battery to reliably supply the consumers present in the motor vehicles with electrical energy depends to a considerable extent on the thermal conditions prevailing in the environment of the battery. This is because both the electrochemical processes occurring in the battery in the provision and also in the receiving of electrical energy—in the sense of recharging—are greatly dependent on the operating temperature of the battery. Investigations of various lithium-ion-based battery systems have shown, for instance, that below a critical temperature, for instance in the region of approximately 0° C., the electrical energy density made available by the battery decreases greatly compared with higher operating temperatures. Below the critical temperature, in addition damage to the Li-ion cell can occur during charging.

Consequently, the provision of thermally well-defined environmental conditions is of considerable importance for an efficient and interference-free operation of said batteries in the motor vehicle. With regard to the considerable temperature fluctuations occurring under normal operating conditions in the operation of the motor vehicle, this means that these must be compensated by suitable temperature control devices coupled thermally with the battery, in order to keep the environmental temperature of the battery, and hence also the temperature of the battery itself, within a predetermined temperature interval. Such a device must be able, on the one hand, to increase the environmental temperature of the immediate environment of the battery, if the latter assumes a value which lies below the permissible temperature range. On the other hand, the possibility must also be provided to reduce the environmental temperature, if the latter upwardly exceeds said temperature interval.

EP 2 854 212 A1 discloses temperature control device for tempering of a battery. The control device has a cooling device able to be flowed through by a coolant for cooling the battery, an electric heating module for heating the battery, and a heat transmission component for the thermal coupling of the cooling device and the electric heating module to the battery. In the heat transmission component, a recess is present, in which the electric heating module is received and fastened to the heat transmission component by means of an adhesive connection.

SUMMARY

The invention is based on the problem of providing a temperature control device for tempering a battery, which is distinguished by effective thermal coupling with the battery which is to be heated or respectively to be cooled.

The said problems are solved according to the invention by the subject of the independent claims. Preferred embodiments are the subject of the dependent claims.

Accordingly, the basic idea of the invention is to equip a temperature control device for a battery with an electric heating module, which is prefabricated or respectively pre-assembled as a structural unit and is subsequently glued into a recess present in a heat transmission component. This permits a particularly simple, preferably mechanical assembly of the electric heating module on the heat transmission component. The adhesive connection, essential to the invention, between the electric heating module and the heat transmission component brings about a stable mechanical fixing of the heating module in the heat transmission component which, in addition, is to be produced in a cost-efficient manner. The use of a suitable adhesive, particularly a silicone glue layer, in addition involves a highly effective thermal contact of the electric heating module with the heat transmission component and therefore with the battery which is to be temperature-controlled. The heat transmission part therefore functions as a highly effective thermal interface between the heating module and the battery which is to be temperature-controlled. In addition, the heat transmission component acts as a thermal interface between the battery which is to be tempered and a cooling device which is able to be flowed through by a coolant. After the installation of the electric heating module in the heat transmission component, the cooling device is mounted on the heat transmission component.

A temperature control device according to the invention comprises a cooling device, able to be flowed through by a coolant, for cooling the battery, an electric heating module for heating the battery and a heat transmission component for the thermal coupling of the cooling device and of the electric heating module to the battery which is to be temperature-controlled. According to the invention, at least one recess is present in the heat transmission component, into which recess the heating module is received and is fastened to the heat transmission component by means of an adhesive connection.

According to the invention, the recess is arranged on a first side, in particular on an upper side or underside, of the heat transmission component. The heating module received in the recess terminates flush with the first side. This means that said first side is constructed so as to be substantially flat. The cooling device lies in a planar manner against the first side of the heat transmission component, which leads to an improved thermal contact of the heat transmission component with the cooling device.

In an advantageous further development, a second side, lying opposite the first side, in particular an underside or upper side, of the heat transmission component is constructed so as to be substantially flat for planar abutment on the battery which is to be temperature-controlled. In this way, a good thermal coupling can be achieved of the battery which is to be temperature-controlled with the temperature control device, and the required installation space can be kept small.

In a further preferred embodiment, the heating module comprises a carrier part constructed in a grid-like manner with at least two receiving elements, in which respectively an electric heating device is arranged. Such a carrier part allows the electric heating module to be equipped with two or more heating devices which can be pre-mounted on the carrier part. This measure considerably simplifies the assembly of the temperature-control device.

Particularly expediently, the respective heating device can be inserted into an aperture present in the receiving element and can be glued to the carrier part. This permits a particularly advantageous pre-assembly with regard to manufacturing technique of the electric heating devices and of the carrier part to the electric heating module, which can then be inserted as a structural unit into the recess present in the heat transmission component.

In an advantageous further development, the carrier part has at least two longitudinal struts and at least two transverse struts, extending transversely, in particular at a right angle, to the longitudinal struts and connecting these with one another. In this variant, the at least two receiving elements are formed by the longitudinal or transverse struts of the carrier part. Particularly preferably, the longitudinal and transverse struts are formed integrally to one another, so that a separate mounting of the individual longitudinal and transverse struts to the carrier part can be dispensed with.

Particularly expediently, the at least one heating device can be constructed in longitudinal shape and has along the transverse strut or longitudinal strut a longitudinal side, the length of which is at least five times, preferably at least ten times, most preferably at least twenty times the length of a transverse side extending transversely to the transverse or respectively longitudinal strut.

To reduce the structural space requirement, it is recommended to realize the electric heating device in a flat construction. For this, it is proposed to dimension the outer dimensions of the heating device such that in a direction perpendicularly in longitudinal direction defined by the longitudinal side and also to the transverse direction defined by the transverse side, the heating device has an overall height which is at most one tenth of the length of the longitudinal side. A variant in which the overall height is at most one twentieth of the length of the longitudinal side is particularly preferred.

In a further preferred embodiment, the carrier part has a first and a second electric conduction path for the electrical connecting of the electric heating module with a plus or respectively minus pole of an electrical energy source. The two electric conduction paths are at least partially surrounded by a covering of an electrically insulating material. Preferably, the electrically insulating material is a plastic. The regions of the carrier part in which the two electric conducting paths are to be contacted electrically with the electric heating devices can remain exempted from the covering. In this variant, the carrier part serves not only for receiving the electric heating elements, but also provides the electrical connection, necessary for the operation of the electric heating devices, with an external electrical energy source. A costly separate electrical wiring of the electric heating devices can be dispensed with in this variant.

Particularly expediently, an electrical connection with a plug element is constructed on one of the transverse or longitudinal struts. In this embodiment, a provision of a separate electrical connection, involving considerable additional manufacturing expenditure can be dispensed with. The electrical connection can also be constructed in the manner of a strut, in particular a longitudinal or transverse strut. Said electrical connection can be formed integrally on the carrier part comprising longitudinal and transverse struts. The electrical connection can project outwards from one of the longitudinal or transverse struts of the carrier part. By means of the electrical connection, the two electric conduction paths are able to be connected with the plus or respectively minus pole of the electrical energy source.

For the electrical connection of the heating devices to the two electric conduction paths, each heating device has an upper and a lower electrically conductive contact plate for the electrical contacting of the heating device with the electrical energy source. Between the two contact plates, at least two PTC heating elements are arranged at a distance and adjacent to one another. Alternatively to the PTC heating elements, other suitable heating elements can also be used. In this variant, the upper contact plate serves for the production of an electrical connection between the PTC heating elements and the first electric conducting path, and the lower contact plate for the production of an electrical connection between the PTC heating elements and the upper electric conducting path or vice versa.

In another preferred embodiment, an electrical insulation of an electrically insulating material is arranged respectively in the recess present in the heat transmission part in a sandwich-like manner between the heat transmission part and the respective electric heating device. In this way, an undesired electric short-circuit can be ruled out between the electrically conductive lower contact plate and the heat transmission component, typically of an electrically conductive material—preferably of a metal.

A further preferred embodiment, in which the electrical insulation is constructed as a ceramic plate as a insulated layer is particularly simple to produce and therefore is associated with particularly low manufacturing costs. For the construction in plate form, other suitable materials, in particular suitable plastics, can also be used.

Particularly expediently, the electrical insulation can be fastened by means of an adhesive connection on the lower contact plate of the heating device and/or on the heat transmission part. Particularly preferably, the electrical insulation, constructed as a ceramic plate, is glued into the recess present in the heat transmission component. Such an adhesive connection is able to be realized in a technically simple manner and permits a stable fixing of the electrical insulation on the heat transmission component.

In a further preferred embodiment, a protective layer is present at least in certain areas on the first side of the heat transmission unit. This protective layer covers the electric heating module received in the recess. In this way, the electric heating module can be protected effectively against contamination and moisture.

Particularly preferably, the protective layer is formed in a gel-like manner. For example, a dielectric tough gel can be used. Such a gel can be applied on the first side in a simple manner in the course of the assembly of the temperature control device.

In a further preferred embodiment, the heat transmission part consists of a metal or comprises a metal. A heat transmission component of metal is easy to process, so that in particular the recess can be introduced in a simple manner into the heat transmission component. Furthermore, metals have a high thermal conductivity, which permits a high degree of thermal coupling of the heat transmission component with the battery which is to be temperature-controlled.

The invention further relates to a battery arrangement for a motor vehicle. The battery arrangement has a battery, comprising a battery housing, in particular a Li-ion battery. The previously presented temperature control device is coupled with this battery. For the purpose of such a thermal coupling, the battery housing lies in a planar manner against the heat transmission component of the temperature control device.

Finally, the invention comprises a motor vehicle with at least one such battery arrangement.

Further important features and advantages of the invention will emerge from the sub-claims, from the drawings and from the associated figure description with the aid of the drawings.

It shall be understood that the features mentioned above and to be explained in further detail below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically

DETAILED DESCRIPTION

Figure 1:
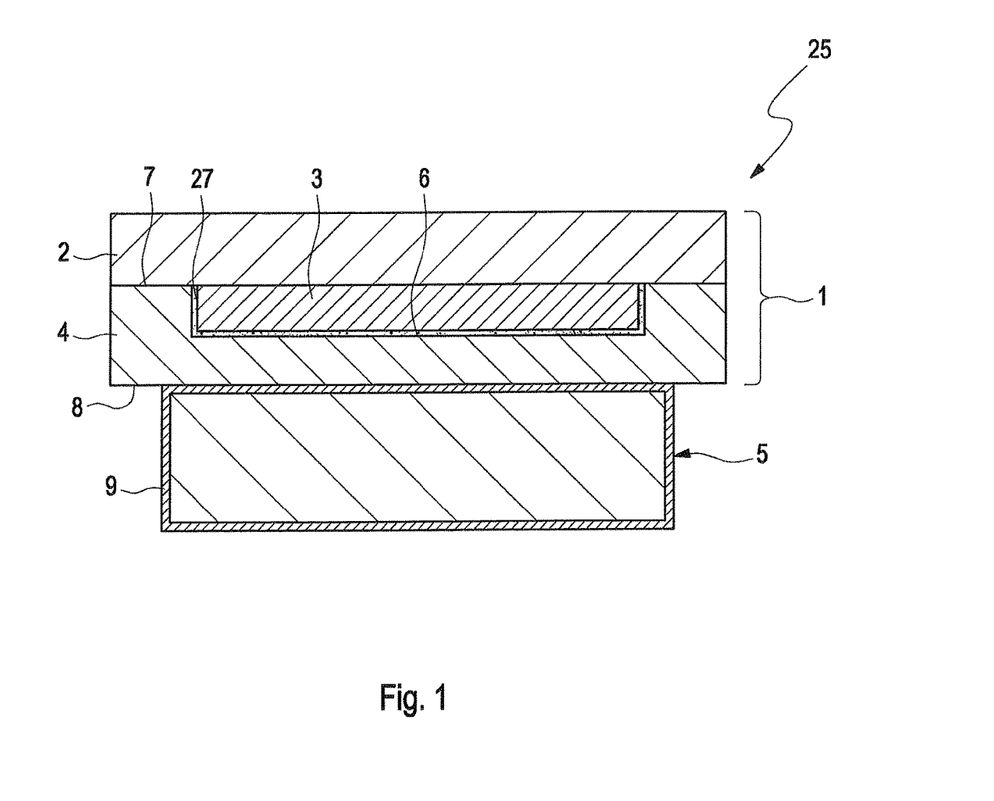
FIG. 1 an example of a temperature control device according to the invention.

FIG. 1 shows in a rough diagrammatic illustration the structure of a temperature control device 1 according to the invention for tempering of a battery 5 having a battery housing 9. The temperature control device 1 and the battery 5 together form a battery arrangement 25. The temperature control device 1 has a cooling device 2 for cooling the battery 5, an electric heating module 3 for heating the battery 5 and a heat transmission component 4 for the thermal coupling of the cooling device 2 and of the electric heating module 3 to the battery 5 which is to be temperature-controlled. The heat transmission part 4 preferably consists of a metal or comprises a metal. In a variant, another suitable material with high thermal conductivity can also be used for the heat transmission component 4. A recess 6 is present in the heat transmission component 4, in which recess the electric heating module 3 is received and fastened to the heat transmission component 4 by means of an adhesive connection 27. A recess 6 is present on a first side 7 of the heat transmission component 4, which in the example is an upper side of the heat transmission component 4 with respect to a position of use of the temperature control device. In a variant not shown in the figures, the first side 7 can be an underside of the heat transmission component 4. The electric heating module 3 is received in the recess 6.

According to FIG. 1, a second side 8 lying opposite the first side 7, in the example of FIG. 1 an underside of the heat transmission component 4, is constructed so as to be substantially flat, so that a battery housing 9 of the battery 5 which is to be temperature-controlled can lie in a planar manner against the second side 8 of the heat transmission component 4. In this way, a high degree of thermal coupling can be achieved between the battery 5 and the heat transmission component 4. The cooling device 2 is constructed for flowing through by a coolant. For this, it can have a suitable duct structure which is not illustrated in further detail in the figures. Such a duct structure can be realized by means of suitably configured tubular bodies and can have one or more distributors, collectors, deflectors and collectors, by means of which the coolant can be distributed to the tubular bodies, deflected after flowing through and after again flowing through collected from the tubular bodies again for directing out of the temperature control device.

Figure 2:
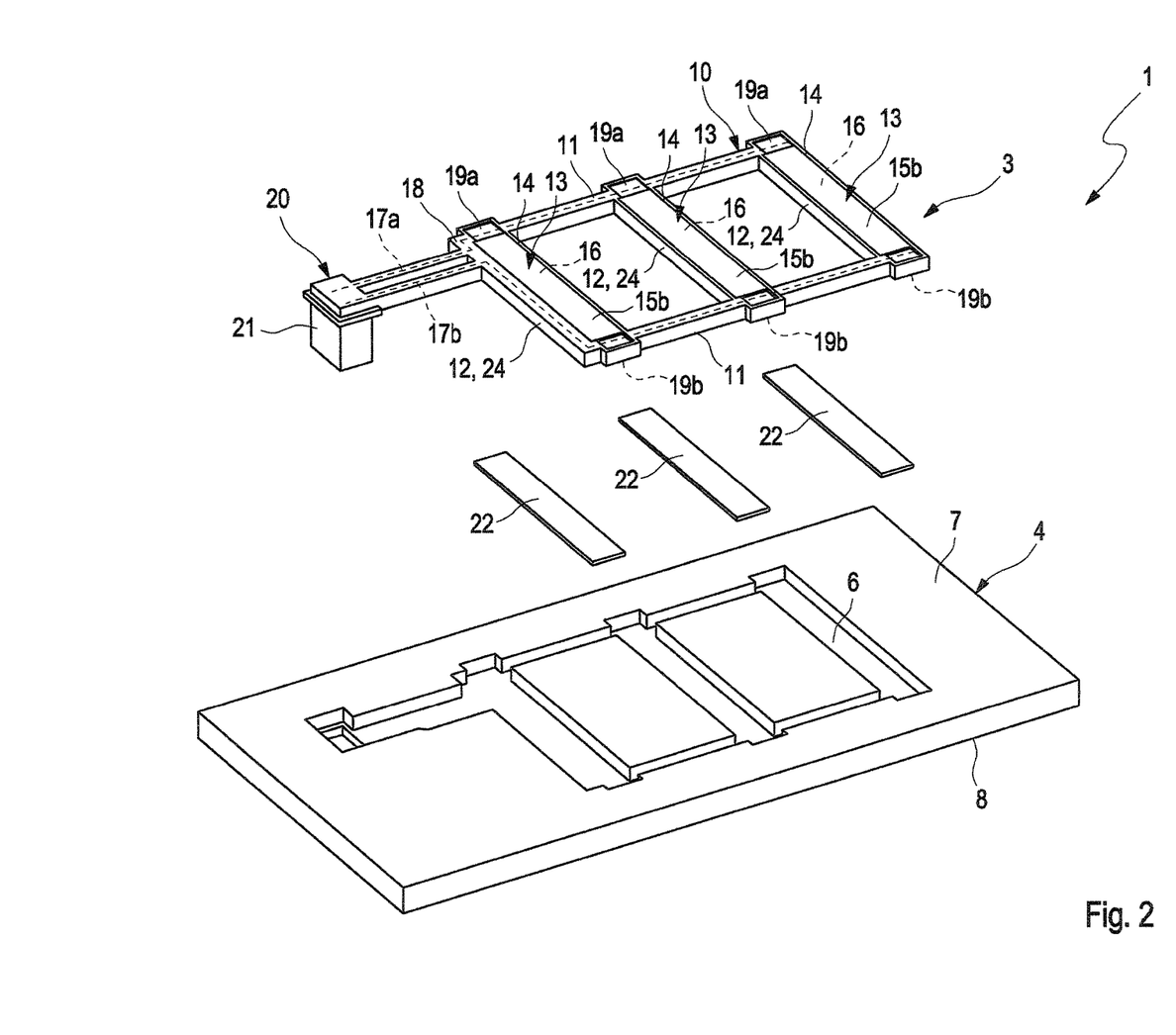
FIG. 2 in an exploded illustration, the temperature control device of FIG. 1 in a perspective view and without cooling device, FIG. 3 the temperature control device of FIG. 2 in an installed state, FIG. 4 a heating device of the heating module in a cross-section.
Figure 3:
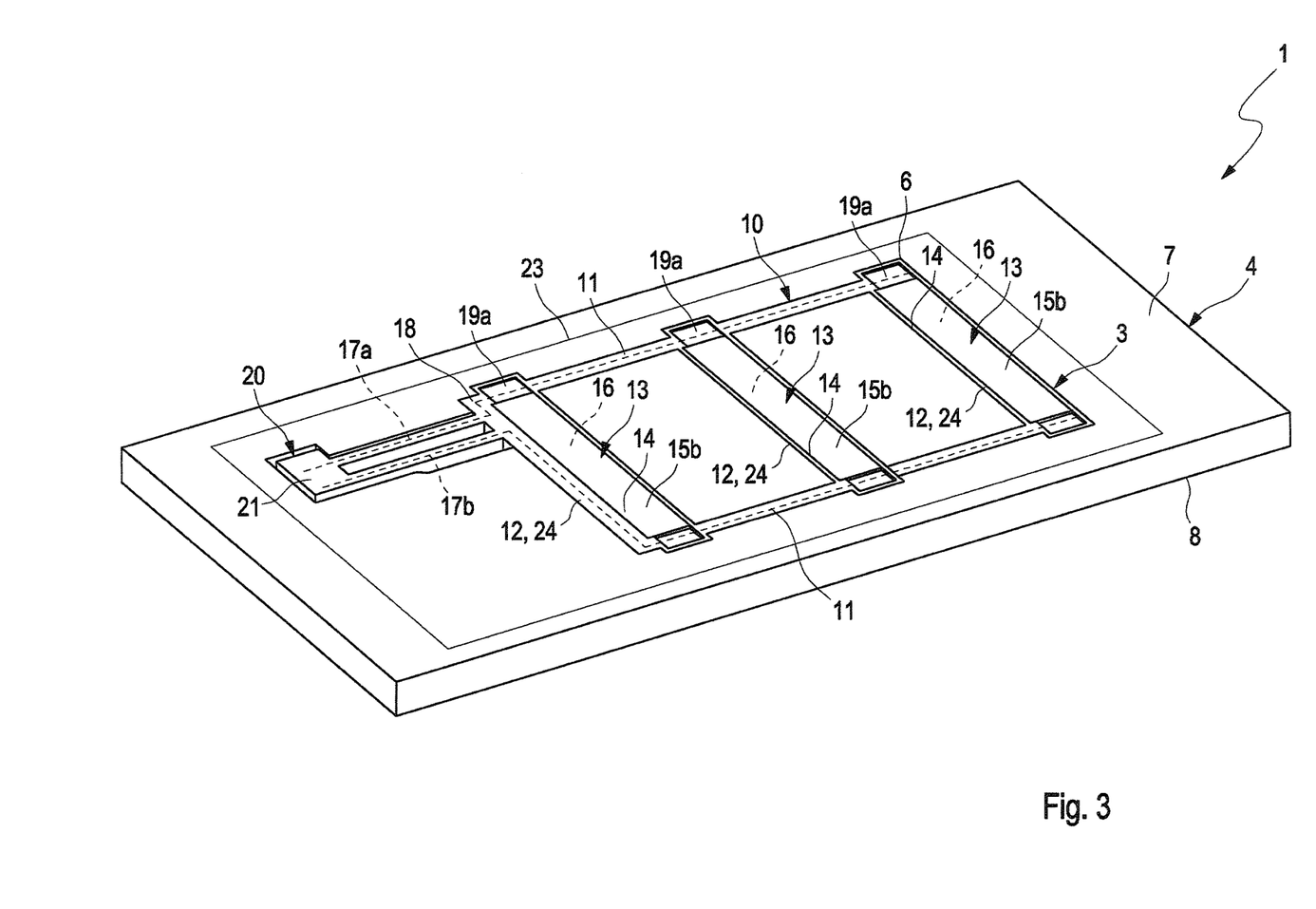

FIGS. 2 and 3 illustrate the temperature control device 1 of FIG. 1 in a perspective view and without cooling device 2. FIG. 2 shows the temperature control device for better intelligibility of its structure in an exploded illustration. As FIG. 3 shows, the heating module 3 received in the recess 6 terminates flush with the first side 7, so that the cooling device 2, as illustrated diagrammatically in FIG. 1, lies in a planar manner against the first side 7 of the heat transmission component 4. This results in a high degree of coupling between the cooling device 2 and the heat transmission component 4.

In accordance with FIGS. 2 and 3, the heating module 3 comprises a carrier part 10, in particular constructed in a grid-like manner, which is preferably constructed in a grid-like manner. In the example of FIGS. 2 and 3, the carrier part 10 has two longitudinal struts 11 and three transverse struts 12, which are connected with one another transversely to the longitudinal struts 11 and two adjacent longitudinal struts 11. In variants of the example, both the number of longitudinal struts 11 which are present and also the number of transverse struts 12 which are present can vary. Each transverse strut 12 is constructed as a receiving element 24 for receiving an electric heating device 13 of the heating module 3. The electric heating devices 13 can be constructed as a PTC heating element 16 or can comprise several PTC heating elements 16, and are constructed in a plate-like manner, which facilitates the realizing of the temperature control device 1 in a flat construction.

As the exploded illustration of FIG. 2 clearly demonstrates, in the example scenario of FIGS. 2 and 3, the three electric heating devices 13 which are present are inserted into respective apertures 14 present in the transverse struts 12. This enables a good thermal contact of the electric heating device 13 with the heat transmission component 4.

Figure 4:
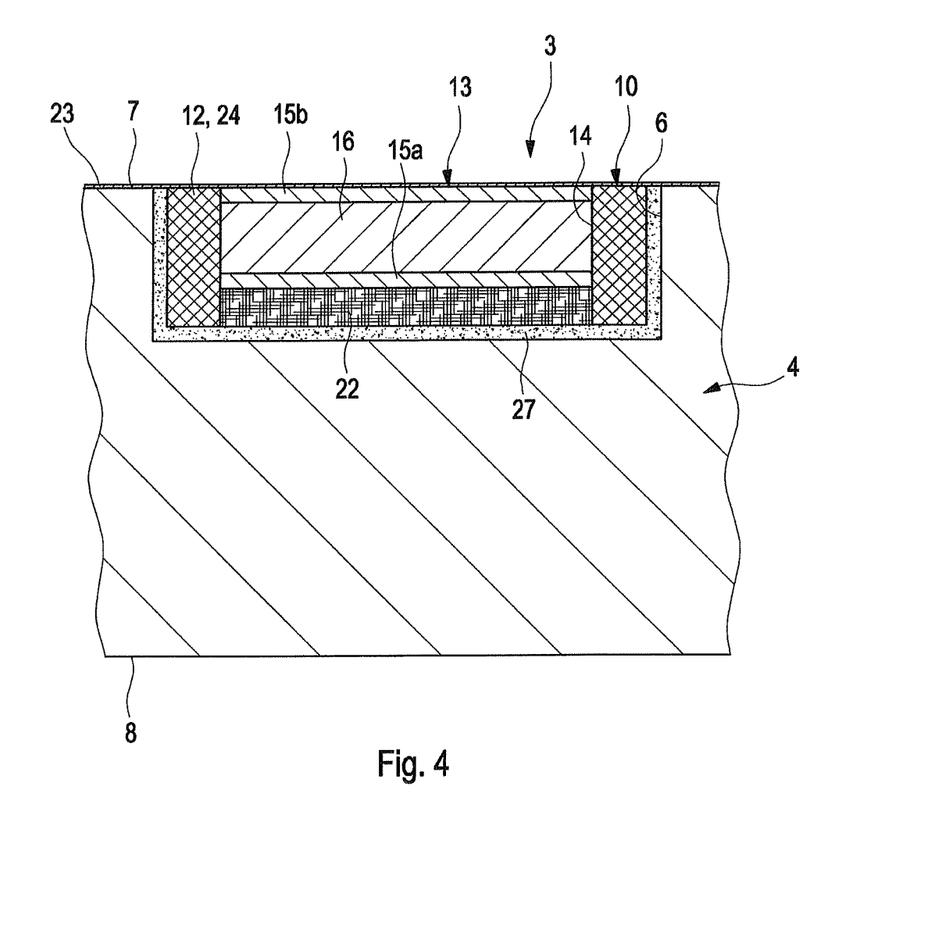

FIG. 4 shows in diagrammatic illustration the structure of an electric heating device 13 with an electric heating module 3, installed in the heat transmission component 4, in a cross-section. It can be seen from FIG. 4 that the electric heating device 13 has a lower and an upper electrically conductive contact plate 15a, 15b for the electrical contacting of the heating device 13 with an electrical energy source. The PTC heating elements 16 can be arranged in a sandwich-like manner as well as adjacent and at a distance from one another between the two contact plates 15a, 15b.

In accordance with FIG. 2, the carrier part 10 has a first and a second electric conduction path 17a, 17b for the electrical connecting of the electric heating module 3 with the plus or respectively minus pole of an electrical energy source. The two conduction paths 17a, 17b are indicated in FIG. 2 only diagrammatically by dashed lines and can be realized in the manner of a flexible electric cable or a rigid current bar, respectively of an electrically conductive material, preferably a metal. The carrier part 10 has in sections a covering 18 of an electrically insulating material, in particular of a plastic, which surrounds the two conduction paths 17a, 17b for electrical insulation with respect to the environment. "In sections" means here that the two electric conduction paths are exposed in individual regions, i.e. are not surrounded by the covering 18 of plastic. These regions serve for the electrical contacting of the two conduction paths 17a, 17b with the lower or respectively upper contact plate 15a, 15b and therefore with the PTC heating elements 16 of the electric heating device 13. Said regions are designated in FIG. 2 by the reference number 19a or respectively 19b.

As FIG. 2 clearly demonstrates, an electrical connection 20 is constructed with a plug element 21 on one of the three transverse struts 12—in a variant, this can also be a longitudinal strut 11. By means of the electrical connection 20, the two electric conduction paths 17a, 17b can be electrically connected with the plus or respectively minus pole of the external electrical energy source.

In order to rule out an electric short-circuit between the lower electric contact plate 15a and the PTC heating elements 16 and the heat transmission component 4, an electrical insulation of an electrically insulating material is arranged in the recess 6, present in the heat transmission component 4, respectively in a sandwich-like manner between the heat transmission part 4 and the respective lower contact plate 15a of the heating device 13.

The three electrical insulations 22 shown in FIG. 2 can be constructed as a ceramic plate, as shown, or else, alternatively thereto, as an insulated layer. In the example of the figures, the electrical insulations 22 are glued into the recesses 6, i.e. are fastened by means of the adhesive connection 27 (cf. FIGS. 1 and 4) on the heat transmission part 4.

However, a protective layer 23, present in certain areas on the first side 7 of the heat transmission unit 4, is indicated diagrammatically in FIG. 3, which protective layer covers the heating module 3, received in the recess 6, for protection against moisture. The protective layer 23 is preferably formed in a gel-like manner.

The terms "upper side" and "underside" of the heat transmission component 4 and "lower contact plate 15a" and "upper contact plate 15b" refer to a possible position of use, for instance in the use of the temperature control device 1 in a motor vehicle. It is clear that the temperature control device 1 can also be arranged with a different orientation, for example such that the component designated here as "lower contact plate 15a" can also be arranged in the motor vehicle beneath the upper contact plate 15b. Of course, a lateral installation position is also not ruled out.

The invention claimed is:

1. A temperature control device for tempering of a battery comprising:
    a cooling device configured to be flowed through by a coolant for cooling the battery, an electric heating module configured to heat the battery and a heat transmission component configured to thermally couple the cooling device and the electric heating module to the battery, the battery being temperature-controlled; and
    the heat transmission component having a recess, wherein the electric heating module is received in the recess and secured to the heat transmission component via an adhesive connection;
    wherein the recess is arranged on a first side comprising one of an upper side or an underside of the heat transmission component, and the electric heating module, received in the recess, terminates flush with the first side;
    wherein the recess is defined by a base surrounded by at least one sidewall extending from the base to the first side of the heat transmission component; and
    wherein the cooling device lies in a planar manner against the first side of the heat transmission component.

2. The temperature control device according to claim 1, wherein a second side comprising the other of the underside or the upper side of the heat transmission component, lying opposite the first side, is constructed substantially flat for planar abutment against the battery, the battery being temperature-controlled.

3. The temperature control device according to claim 1, wherein the electric heating module comprises a carrier part, constructed in a grid-like manner, having at least two receiving elements, and an electric heating device disposed within each of the at least two receiving elements.

4. The temperature control device according to claim 3, wherein the respective heating device is inserted into an aperture defined in the respective receiving element, and is glued to the carrier part.

5. The temperature control device according to claim 3, wherein the carrier part has at least two longitudinal struts and at least two transverse struts extending transversely to the longitudinal struts and connecting the at least two transverse struts to the at least two longitudinal struts, and wherein the at least two receiving elements are defined by at least one of the at least two longitudinal struts and the at least two transverse struts.

6. The temperature control device according to claim 3, wherein the carrier part includes a first and a second electric conduction path configured to electrically connect the electric heating module with a plus or a minus pole of an electrical energy source, respectively, wherein the two electric conduction paths are surrounded at least partially by a covering of an electrically insulating material, the electrically insulating material comprising a plastic.

7. The temperature control device according to claim 5, wherein:
    the carrier part includes a first and a second electric conduction path configured to electrically connect the electric heating module with a plus or a minus pole of an electrical energy source, respectively; and
    one of the transverse struts or the longitudinal struts include an electrical connection having a plug element allowing the two electric conduction paths to be connected with the plus or the minus pole, respectively, of the electrical energy source.

8. The temperature control device according to claim 3, wherein each electric heating device includes a lower electrically conductive contact plate and an upper electrically conductive contact plate configured to allow for the electrical contacting of the electric heating device with the electrical energy source, and wherein at least two PTC heating elements are disposed at a distance and adjacent to each other between the lower electrically conductive contact plate and the upper electrically conductive contact plate.

9. The temperature control device according to claim 8, wherein an electrical insulation of an electrically insulating material is arranged in the recess defined in the heat transmission component, in a sandwich-like manner between the heat transmission component and the lower contact plate of the electric heating device.

10. The temperature control device according to claim 9, wherein the electrical insulation comprises one of a ceramic plate and an insulated layer.

11. The temperature control device according to claim 9, wherein the electrical insulation is secured via an adhesive connection on one of the lower contact plate of the electric heating device and on the heat transmission component.

12. The temperature control device according to claim 11, wherein at least a portion of the first side of the heat transmission component includes a protective layer, the protective layer covering the electric heating module, received in the recess, and is configured to protect against moisture.

13. The temperature control device according to claim 12, wherein the protective layer is gel-like.

14. The temperature control device according to claim 13, wherein the heat transmission component consists of a metal or comprises a metal.

15. A battery arrangement for a motor vehicle comprising:
a Li-ion battery having a battery housing;
a temperature control device, coupled thermally with the battery, the temperature control device comprising:
a cooling device configured to be flowed through by a coolant for cooling the battery, an electric heating module configured to heat the battery and a heat transmission component configured to thermally couple the cooling device and the electric heating module to the battery, the battery being temperature-controlled;
the heat transmission component having a recess, the electric heating module received in the recess and secured to the heat transmission component via an adhesive connection;
wherein the recess is arranged on a first side comprising one of an upper side or an underside of the heat transmission component, and the electric heating module, received in the recess, terminates flush with the first side, and wherein the cooling device lies in a planar manner against the first side of the heat transmission component;
wherein the recess is defined by a base surrounded by at least one sidewall extending from the base to the first side of the heat transmission component; and
wherein the battery housing lies in a planar manner on a second side of the heat transmission component for thermally coupling the battery to the temperature control device.

16. A motor vehicle with at least one battery arrangement comprising:
a Li-ion battery having a battery housing;
a temperature control device, coupled thermally with the battery, the temperature control device comprising:
a cooling device configured to be flowed through by a coolant for cooling the battery, an electric heating module configured to heat the battery and a heat transmission component configured to thermally couple the cooling device and the electric heating module to the battery, the battery being temperature-controlled;
the heat transmission component having a recess, the electric heating module received in the recess and secured to the heat transmission component via an adhesive connection;
wherein the recess is arranged on a first side comprising one of an upper side or an underside of the heat transmission component, and the electric heating module, received in the recess, terminates flush with the first side, and wherein the cooling device lies in a planar manner against the first side of the heat transmission component;
wherein the recess is defined by a base surrounded by at least one sidewall extending from the base to the first side of the heat transmission component; and
wherein the battery housing lies in a planar manner on a second side of the heat transmission component for thermally coupling the battery to the temperature control device.

17. The temperature control device according to claim 9, wherein the electrical insulation comprises a ceramic plate.

18. The temperature control device according to claim 9, wherein the electrical insulation is secured via an adhesive connection on the lower contact plate of the electric heating device.

19. The temperature control device according to claim 5, wherein the electric heating module abuts the base of the recess.

* * * * *